United States Patent
O'Brien et al.

(10) Patent No.: US 9,467,818 B2
(45) Date of Patent: Oct. 11, 2016

(54) METHOD AND APPARATUS FOR IDENTIFYING WIRELESS ACCESS POINTS USING BEACON FRAMES

(75) Inventors: Nolan D. O'Brien, Las Vegas, NV (US); Rodney Smith, Issaquah, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/343,574

(22) Filed: Jan. 4, 2012

(65) Prior Publication Data

US 2013/0170432 A1 Jul. 4, 2013

(51) Int. Cl.
| | | |
|---|---|---|
| *H04W 4/00* | (2009.01) | |
| *H04W 4/06* | (2009.01) | |
| *H04W 48/10* | (2009.01) | |
| *H04L 29/06* | (2006.01) | |
| *H04W 48/12* | (2009.01) | |
| *H04W 48/08* | (2009.01) | |
| *H04W 8/24* | (2009.01) | |

(52) U.S. Cl.
CPC ................ *H04W 4/06* (2013.01); *H04L 69/22* (2013.01); *H04W 48/10* (2013.01); *H04W 48/12* (2013.01); *H04W 8/245* (2013.01); *H04W 48/08* (2013.01)

(58) Field of Classification Search
None
See application file for complete search history.

(56) References Cited

U.S. PATENT DOCUMENTS

| | | | | |
|---|---|---|---|---|
| 2007/0026807 A1* | 2/2007 | Kish | .................... | H04B 7/0408 455/63.4 |
| 2007/0087682 A1* | 4/2007 | DaCosta | ............... | H04W 48/12 455/3.01 |
| 2011/0019653 A1* | 1/2011 | Seok | .............................. | 370/338 |
| 2011/0216748 A1* | 9/2011 | Kawase | ........................ | 370/338 |
| 2011/0281557 A1* | 11/2011 | Choi et al. | .................... | 455/411 |
| 2011/0317579 A1* | 12/2011 | Jones et al. | ................... | 370/252 |
| 2012/0170471 A1* | 7/2012 | Brown | .................. | H04W 48/20 370/252 |
| 2012/0184242 A1* | 7/2012 | Li et al. | ........................ | 455/406 |
| 2012/0254614 A1* | 10/2012 | Kimura | ................. | H04W 12/04 713/168 |
| 2013/0067041 A1* | 3/2013 | Low | ....................... | H04W 8/245 709/220 |
| 2013/0083722 A1* | 4/2013 | Bhargava et al. | ............ | 370/315 |

* cited by examiner

*Primary Examiner* — Jutai Kao
(74) *Attorney, Agent, or Firm* — Patterson + Sheridan, LLP

(57) ABSTRACT

Techniques are described for identifying a wireless access point device using beacon messages and probe responses. An access point may generate and broadcast beacon messages which include an information element containing information specific to the device as well as to the current context of the device. For example, the information element may include a device vendor ID, product ID, and a device-unique ID. That is, the information element provides information related to the device itself independently from the configuration of the wireless network which the beacon message (or probe response) is associated with.

27 Claims, 5 Drawing Sheets

METHOD AND APPARATUS FOR IDENTIFYING WIRELESS ACCESS POINTS USING BEACON FRAMES

TECHNICAL FIELD

Embodiments presented herein generally relate to computer networking devices. More specifically, embodiments presented herein provide techniques for identifying a wireless access point hosting one or more wireless networks.

BACKGROUND

Wireless networks have become commonplace. For example, wireless access points are used in both home and enterprise environments to provide an internet connection to a variety of Transport Control Protocol/Internet Protocol (TCP/IP) enabled devices. The access points typically operate using a version of the IEEE 802.11 wireless local area network protocol (e.g., the 802.11a, b, g or n versions of this protocol). Desktop PCs, laptop PCs, mobile telephones, VoIP telephones, tablets, net-books, video game consoles, digital video recorders, DVD players, video streaming systems, among other devices, can connect to wireless networks operating according to these standards.

To associate itself with a wireless network, a host station typically identifies a service set identifier (SSID) broadcast by an access point and then performs a process defined by the 802.11 protocol to join the wireless network corresponding to that SSID. Users may also need to supply credentials (e.g., a password or PKI certificate) in order to associate a host station with a wireless network. Wireless access points typically broadcast a variety of management frames. Management frames allow hosts to obtain information used to send a request to attach to the wireless network, e.g., to obtain information used to generate a Dynamic Host Configuration Protocol (DHCP) request for an internet protocol address. Similarly, a beacon frame may be used by wireless devices to identify a network configured on the wireless access point. Beacon frames are broadcast over regular periodic intervals, allowing new devices to associate to the wireless network as well as providing information to already associated hosts.

BRIEF DESCRIPTION OF THE DRAWINGS

So that the manner in which the features the embodiments presented herein can be understood in detail, a more particular description may be had by reference to example embodiments, some of which are illustrated in the appended drawings. It is to be noted, however, that the appended drawings illustrate only example embodiments and are therefore not to be considered limiting of its scope.

DESCRIPTION OF EXAMPLE EMBODIMENTS

Overview

Figure 1:
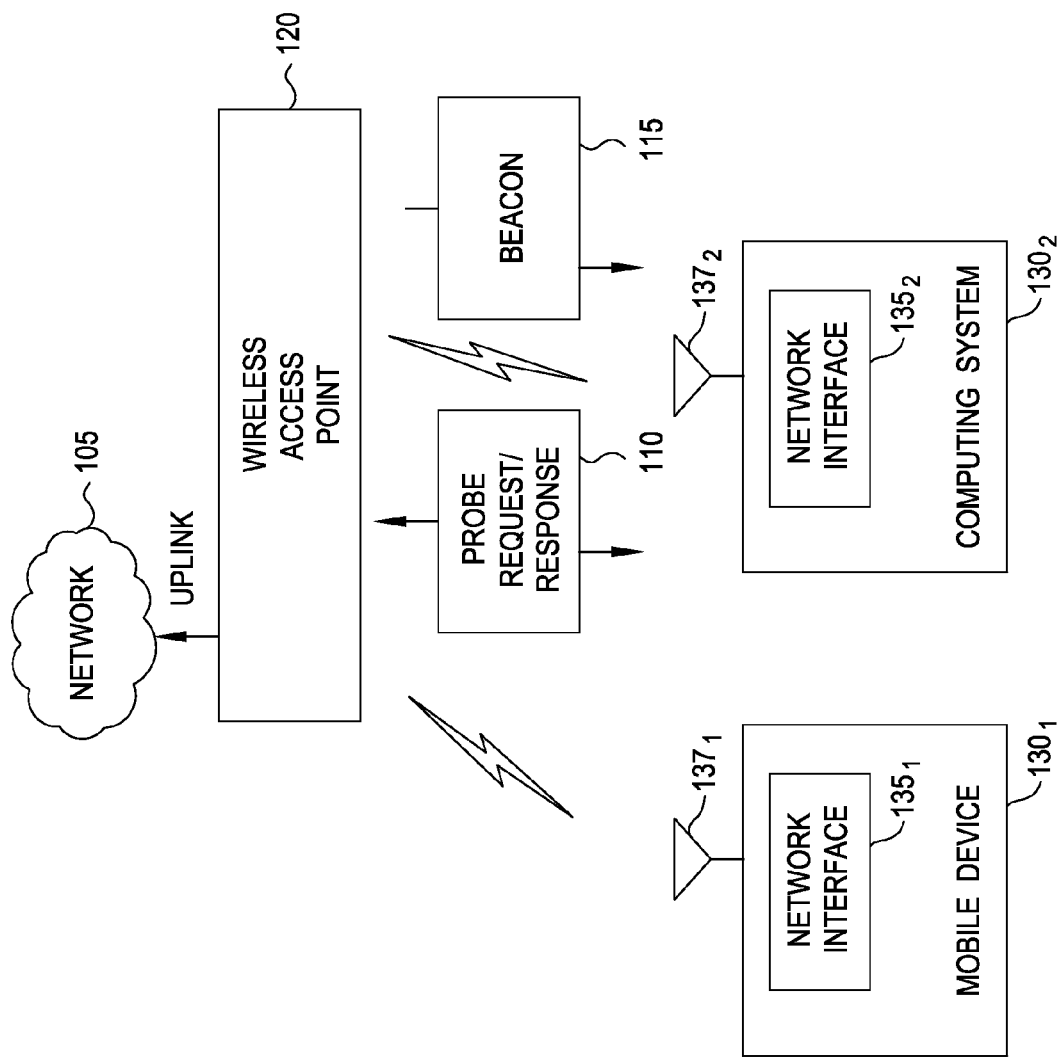
FIG. 1 illustrates an example computing environment which includes a wireless access point, according to one embodiment presented in this disclosure.

One embodiment includes a computer-implemented method. This method may generally include exposing, on a wireless access point device, at least a first wireless network and also include generating a first management frame corresponding to the first wireless network. The management frame includes an information element storing a plurality of information fields. The information fields store information related to the wireless access point device that is independent from a configuration of the first wireless network. The management frame includes an information element storing a plurality of information fields storing information related to the wireless access point device that is independent of a configuration of the first wireless network exposed on the wireless access point device. This method also includes broadcasting the management frame to one or more client devices within range of the wireless access point.

Other embodiments include, without limitation, a computer-readable medium that includes instructions that enable a processing unit to implement one or more aspects of the disclosed methods as well as a system configured to implement aspects of the disclosed methods.

Example Embodiments

While a beacon frame may provide information about a network configured on an access point, access point configurations can change over time. Further, most access points can be "factory reset," restoring a default configuration state to an access point. As a result, it can be difficult to identify a specific access point from the various management frames broadcast by an access point, other than through a Media Access Control (MAC) address. However, a single physical access point can provide virtual access points (VAPs) via virtualization and radio bandwidth difference. In such cases, each VAP may use a different MAC address. Each VAP provides an access point with its own distinct network configuration—as though there were two (or more) physical access points in a given environment. Each VAP may be identified by a beacon or probe response, but does not provide information indicating that the virtual access points are on a single device. Further still, the management frames provide little information about device context.

Embodiments presented herein provide a wireless access point configured to broadcast management or beacon frames which convey identity and context information to devices within broadcast range. Doing so allows configuration software to distinguish one access point from another, as well as identify when multiple VAPs are hosted by a common physical device. In one embodiment, the access point may encode device-specific information in an information element broadcast as part of a basic service set (BSS) beacon of a wireless interface on an access point. The information elements may allow clients to discover devices without needing to establish a connection or associate to a network on the access point. Instead, the client simply observes the beacon frames. Further, this approach allows the information element to be broadcast without interfering or conflicting with well-established wireless networking standards; namely, the suite of 802.11 protocols.

Further still, doing so allows multiple virtual access points to be identified as being hosted on a common access point as well as the state/context of each virtual access point to be determined. This permits easy discovery of a desired device as well as easy rediscovery of a previously connected device across settings changes which alter the identifiable attributes of the BSS beacon or probe response frames.

In one embodiment, the information element may contain information specific to both the configuration and current context of the device. For example, the information element may include a device vendor ID, product ID, and a device-unique ID. This information element may also include a version field used to identify a version of firmware or applications running on the device. This may be useful for discerning device compatibility—allowing a configuration or setup application to enable (or disable) certain configuration features depending on their support on the device.

The information element may also include context specific information regarding a device's configuration or state. The context information may provide the client with device and/or access point specific information, e.g., whether a device is configured or factory reset or whether a VAP is acting as a guest, configuration, or primary wireless network on a wireless access point. The context information could also provide an indication of load or utilization for the access point. Doing so would allow a client in an environment with multiple access points (or a single access point with multiple radios) to account for congestion at a given access point when selecting one of the access points to associate to. Thus, in addition to identifying an access point and its state for setup purposes, the context information can include additional information in the beacon signal, allowing clients to make intelligent decisions based on performance.

Similarly, the context information may indicate what features are supported. That is, the context information could provide an indication of supported features such as geolocation services or QRCode support. As another example, the context information could also indicate the status of an upstream link on the access point. For example, if an access point no longer has upstream WAN access, then it can turn off the WAN/internet bit in a context information field to signal to clients that it does not currently have access. This is useful for mobile hotspots where reliance on another radio may mean that internet access may vary.

Thus, using the BSS frame of a beacon or probe response, an information element specific to the identity of the device may permit clients to identify the access point (or access points) they are looking for. With the client knowing the identity of a given access point, the client may track the device via beacons and probe responses across settings changes and factory resets as well as observe a variety of configuration and current state context information about the device.

Note, the following description describes embodiments implemented in a manner that integrates with the existing 802.11 standards. However, one of ordinary skill in the art will recognize that embodiments presented in this disclosure can be generally applicable and extensible to other wireless networking protocols or network infrastructures. That is, the techniques presented herein may be adapted for use with other wireless networking infrastructures where one device advertises itself to clients using a beacon (or other) management frames.

FIG. 1 illustrates an example computing environment 100 which includes a wireless access point 120 configured according to one embodiment presented in this disclosure. As shown, the computing environment 100 includes a wireless access point 120 which provides an uplink to a network 105 (e.g., the internet) for a plurality of wireless clients $130_{1-2}$. Illustratively, two such clients $130_{1-3}$ have established a connection to a wireless network hosted by the access point 120. Specifically, a mobile device $130_1$ and a computing system $130_2$. The client devices $130_{1-2}$ each include a transceiver and antenna $137_{1-2}$ used to exchange modulated RF signals with the access point 120.

Mobile device $130_1$ is included to be representative of a variety of handheld computing devices such as a mobile telephone or "Smartphone," handheld computing tablet, video game and a digital music/video players, etc. As shown, the mobile device $130_1$ network interface $135_1$ used to connect the mobile device 1301 to a network hosted by the wireless accede point. Network interface $135_1$ may include the appropriate hardware and software modules used to send/receive network frames composed according to one of the 802.11 networking protocol standards.

Similarly, computing system $130_2$ is included to be representative of a desktop, laptop, or other computer. Accordingly, computing system $130_2$ may include a processor, memory, and storage device, along with the appropriate computing peripherals (e.g., a network interface $135_2$, display, keyboard, mouse, etc.). Like the mobile device $130_1$ network interface $135_2$ may include the appropriate hardware and software modules used to send/receive network frames composed according to one of the 802.11 networking protocol standards.

In one embodiment, the wireless access point 120 exposes one or more wireless networks. That is, once a wireless network is configured, the access point 120 exposes it to clients, allowing clients to associate themselves with that network. As shown, a beacon message 115 has been broadcast from the wireless access point 120. In one embodiment, the host station (i.e., mobile device $130_1$ and computing system $130_2$) receive beacon messages 115 from each access points within range advertising their SSIDs (including a beacon for each virtual access point configured on wireless access point 130. That is, each network exposed by the wireless access point 120 may be identified through the advertised SSID beacons. The client devices can then either manually or automatically—based on configuration—select a wireless to network to associate with or join. Further, in one embodiment, the beacon message 115 may include an information element used to provide device specific information (e.g. a device vendor, product, and device ID) along with current context information regarding the device's current state or configuration. Doing so allows applications on the computing system (e.g., configuration software) to determine whether the beacons are being broadcast from separate devices or from multiple virtual access points on a single device. Further, the information element could allow the configuration software to identify a device that has been previously configured via that software application but subsequently reset to a factory default state. In such a case, the software could offer to restore prior network configuration settings. Similarly, including a device-specific information element in the beacon message 115 allows the configuration software to identify a specific access point in an environment where multiple access points are present—e.g., in an enterprise setting where multiple devices are broadcasting the same SSID or in a residential apartment building where multiple devices (and beacon messages 115) are visible to the configuration software.

A host station (i.e., mobile device $130_1$ and computing system $130_2$) may also send a probe request frame to trigger a probe response when the station needs to obtain information from another station. For example, a host station broadcasts a probe request when using active scanning to determine which access points are within range for possible association. As with the beacon message 115, in one embodiment, a probe response message may include an information element used to provide device specific information (e.g. a device vendor, product, and device ID) along with current context information regarding the device's current state or configuration. That is, in addition to the periodic beacon message 115, which broadcasts the information element at regular intervals, a host station may also send a probe request, which results in the wireless access point generating a response which includes the information element used to identify a given access point 120.

Figure 2:
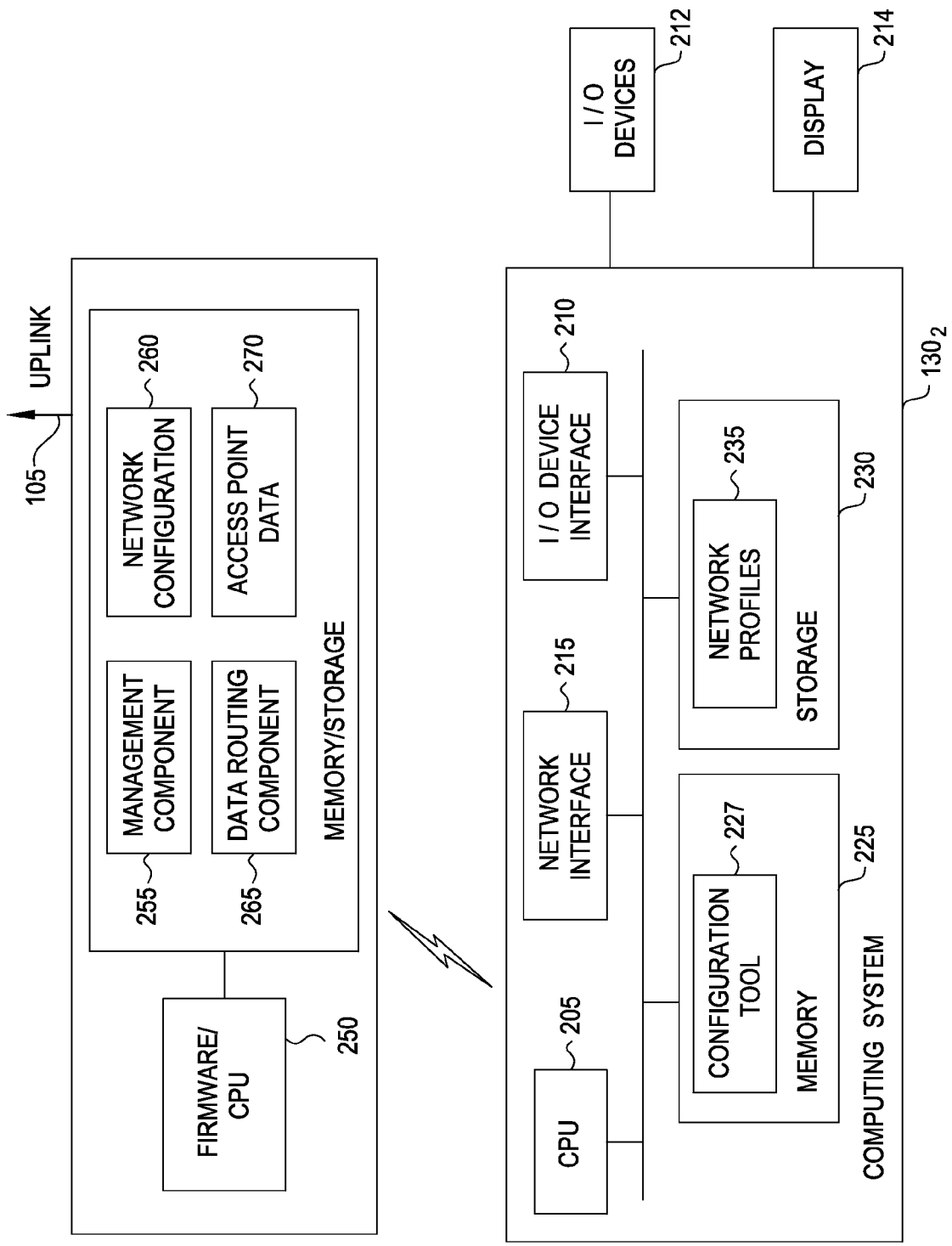
FIG. 2 further illustrates the wireless access point and a computing system first illustrated in FIG. 1, according to one embodiment presented in this disclosure.

FIG. 2 further illustrates the wireless access point 120 and a computing system $130_2$ first illustrated in FIG. 1, according to one embodiment presented in this disclosure. As shown, the computing system $130_2$ includes, without limitation, a central processing unit (CPU) 205, a network interface 215, an interconnect 220, a memory 225, and storage 230. The computing system $130_2$ also includes an I/O device interface 210 connecting I/O devices 212 and a display 214 to the computing system 140 (e.g., a keyboard, mouse, and display screen).

The CPU 205 retrieves and executes programming instructions stored in the memory 225. Similarly, the CPU 205 stores and retrieves application data residing in the memory 225. The interconnect 220 facilitates transmission, such as programming instructions and application data, between the CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory. The storage 230 may be, e.g., a disk drive or a solid state storage device (SSD). The network interface 215 is used by the client system 140 to connect to a wireless networks provided by the access point 120 as well as receive beacon messages and probe responses sent by the access point 120.

Illustratively, the memory 225 includes a configuration tool 227 and storage 230 stores network profiles 235. The configuration tool 227 may provide software used to access and configure the wireless access point 120 (e.g., to define one or more wireless networks exposed on the access point 120). For example, the configuration tool 227 may allow a user to specify an SSID for the access point (or for multiple, virtual access points) as well as enable security features or configure other aspects of a wireless network (e.g., firewall rules, DHCP settings, port forwarding, device access imitations etc.). In one embodiment, when a user configures a wireless network on the access point 120, the tool 227 may store a network profile 235 used to identify the access point 120 in a variety of scenarios. For example, the network profile 235 may store components of the information element used to identify the access point 120 across multiple virtual access points, across a factory reset, or across changes to the settings of a given wireless network configuration.

Further, as noted above, the configuration tool 227 may use data stored in an information element of a beacon to distinguish one access point from another or to identify an access point despite changes to its configuration that result in modifications to the information broadcast in a beacon message (or probe response). That is, the information element provides information related to the device itself independently from the configuration of the wireless network which the beacon message (or probe response) is associated with. In one embodiment, e.g., the information element may contain information specific to the device as well as information regarding the current context of the device. For example, the information element may include a device vendor ID, product ID, and a device-unique ID. This information element may also include a version field used to identify a version of firmware or applications running on the device. The version field may be useful for discerning device compatibility—allowing a configuration tool 227 to enable certain configuration features depending on whether they are supported by the access point 120. The information element may further include context specific information regarding a device's configuration.

As shown, the wireless access point 120 includes firmware 250, management component 255, network configuration 260, data component 265, and access point data 270. The firmware component/processor 205 provides the executable logic of the access point 120, and the memory/storage 252 stores application data and configuration settings used by the access point 120. The firmware component/processor 205 may include an application specific integrated circuit, FPGA, or other processing device, e.g., a CPU having one or more processing cores, etc. Memory 252 may include any combination of volatile and non-volatile memory storage elements, including DRAM, flash memory, SSD storage, or magnetic disk drives, etc.

The data routing component 265 provides executable logic used to send and receive network frames to/from client devices (e.g., computing system $130_2$) which associate themselves to a wireless network exposed by the access point 120. For example, the data routing component 265 may receive network frames from client $130_2$ and forward them over the uplink 105 to another network device, e.g., to a broadband router such as a cable modem). Of course, the wireless access point may be integrated with other network devices such as a broadband router.

In one embodiment, the management component 255 allows a user to configure the access point 120, via the configuration tool 227. For example, the configuration tool may allow users to configure (or automatically configure) a variety of settings on the access point 135 such as an SSID value, whether the SSID value is broadcast, network settings, DHCP settings, firewall settings and the like. The network configuration 260 corresponds to the configuration settings for a wireless network (or multiple virtual access points) hosted by the access point 120. For example, the network configuration 260 may store the SSID names and security settings configured by a user via the configuration tool 227. Access point data 270 provides the device specific information included in an information element broadcast to a client. For example, access point data 270 may store a vendor, product, and device ID data. Such data may be included in information elements broadcast by the access point in beacon messages. Further, access point data 270 may also include firmware version data or other context specific information regarding the current configured state of the access point 120.

Figure 3A:
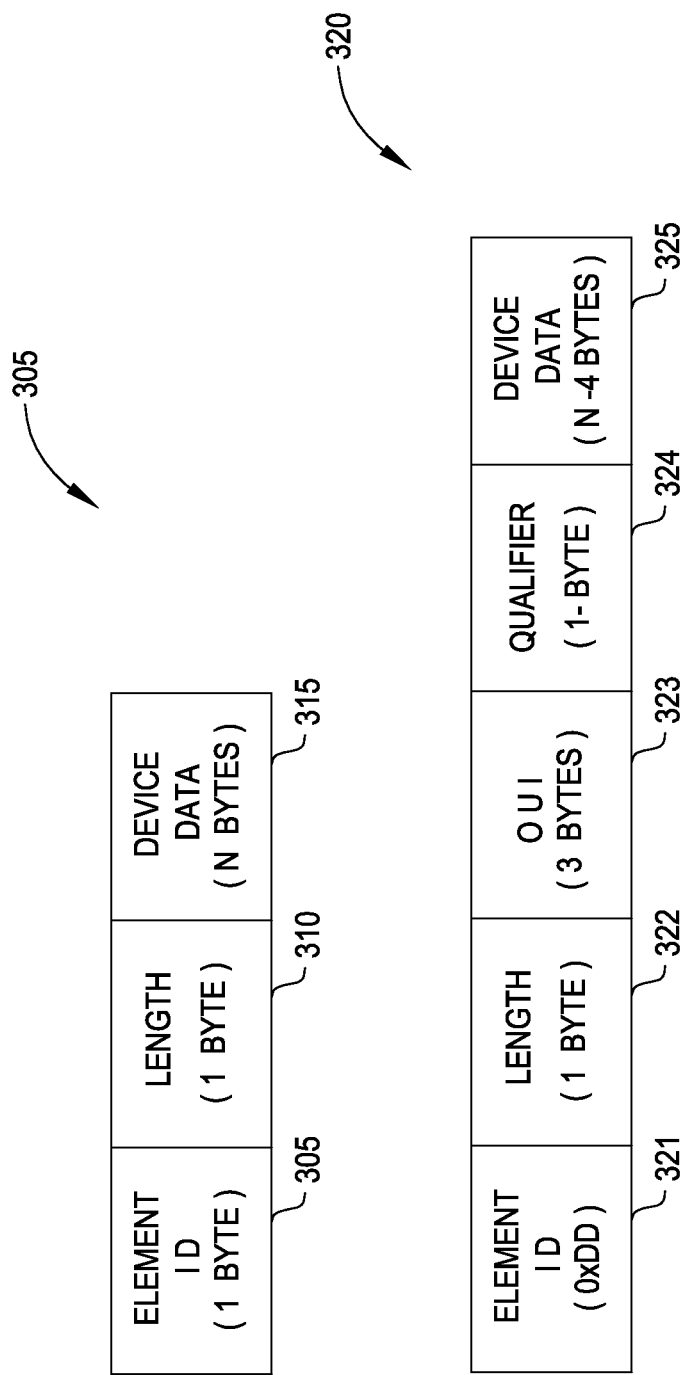
FIG. 3A illustrates an example format for data frames broadcast from a wireless access point in order to identify that wireless access point, according to one embodiment presented in this disclosure.
Figure 3B:
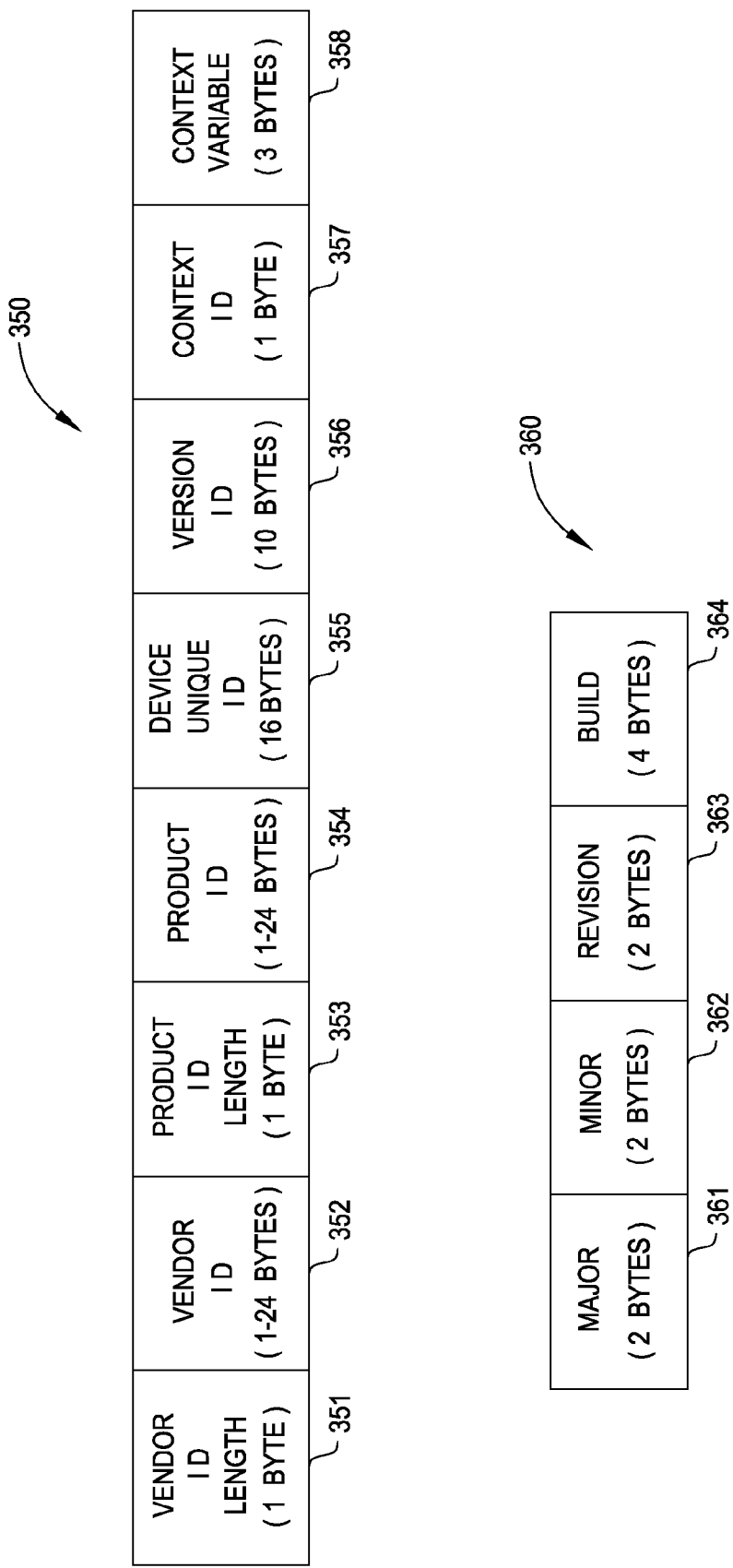
FIG. 3B illustrates an example format for data frames broadcast from a wireless access point in order to identify that wireless access point, according to one embodiment presented in this disclosure.

FIGS. 3A and 3B illustrate example formats for encoding device data broadcast from a wireless access point in order to identify that wireless access point, according to one embodiment presented in this disclosure. More specifically, FIG. 3A illustrates an example embodiment where the information element is encoded in a management frame (e.g., a beacon or probe response) as defined by the IEEE Std 802.11-2007, "IEEE Standard for Information Technology—Telecommunications and information exchange between systems—Local and metropolitan area network—Specific requirements—Part 11: Wireless LAN Medium Access Control (MAC) and Physical Layer (PHY) specifications." Of course, one of ordinary skill in the art will recognize that the example data formats presented in FIGS. 3A and 3B may be adapted for other versions of the 802.11 standard, as well as adapted for use with other wireless protocols or standards.

As shown, frame 305 provides an example of an information element encoded using a reserved information element ID. As shown, the frame 305 includes an element ID field 305 (used to identify the information element) a one byte length field 310, and the device data field 315. Note, while shown as being N bytes in length, the one byte length field 310 limits the device data to 255 bytes. In this example embodiment, one of the element IDs reserved by the IEEE Std 802.11-2007 standard could be assigned for use in carrying the device specific information element.

Alternatively, or additionally, frame 320 provides an example of a device information element encoded in a vendor specific information element—as defined by the IEEE Std 802.11-2007. In this example, frame 320 defines a format for an information element used to store vendor specific functionality, identified using a vendor Organizationally Unique Identifier (OUI) registered with IEEE. As shown, the element ID field 321 is set to a hexadecimal value of 0xDD, indicating that the information element is a "Vendor Specific Information Element" as defined in the IEEE Std 802.11-2007. The frame 320 also includes a one byte length field 322, a 3 byte OUI field 323 used to store the organizationally unique identifier, a one byte qualifier field 324, and an N-4 byte device data field 325. Note, the maximum size of the device data field 325 is slightly smaller in frame 320 as four bytes are needed for the OUI field 323 and the qualifier field 324.

In frames 305 and 320, the device data field 305, 325 respectively, is used to store the device specific information broadcast with a wireless access point beacon (or probe response). FIG. 3B illustrates an example format for data frames broadcast from a wireless access point in order to identify that wireless access point, according to one embodiment presented in this disclosure. More specifically, FIG. 3B illustrates a device data field 350 which includes a plurality of fields used to store device and product data broadcast with a broadcast with a wireless access point beacon. As shown, the device data field 350 includes a one byte vendor ID length field 351 and a corresponding vendor ID field 353 between 1-24 bytes in length. Similarly, the device data field 350 includes a one byte product ID length field 353 and a corresponding product ID field 354 between 1-24 bytes in length. In addition the vendor and product IDs, the device data field also includes a device ID field 255 used to store a 16 byte device ID. For a given vendor and product, the unique device ID effectively acts as a unique serial number.

Further, in addition to the vendor, product, and device ID data, the device data field 350 also includes a ten byte version ID field 356, a one byte context ID field 357, and a three byte context variable 358. The version ID field 356 provides a field used to store version information for a given access point. The version information may correspond to what version of firmware or routing software (or other application packages or software) have been installed on the wireless access point. Data field 360 provides an example format for version ID field 356. Illustratively, the version may be represented as a ten byte field configured using a two byte major version field 361, a two byte minor version field 362, a two byte revision field 363 and a four byte build number field 364. Of course, version ID field 356 could be encoded using a variety of other configurations.

In one embodiment, the context ID field 357 may be used to indicate whether context information is included in the device data field 350. For example, if no context information is included, then the value of the context ID field 357 may be set to zero. A non-zero value indicates that the bits in the context field 358 provide actual context, configuration, and/or state data. For example, bits in the context field 358 may be used to convey whether the device has been configured or is in a factory default state, whether a given wireless network identified in a beacon is a guest network or primary wireless network hosted on an access point, whether an uplink from the access point is available, etc.

As a simple example, a lowest bit in the bit context field 358 could mean the access point has been configured (i.e., is not in a factory default state), the second lowest bit could indicate whether the beacon is for a guest or primary network on the access point, and the third lowest bit could indicate whether the access point currently has WAN/internet access (for the network corresponding to the beacon). Other bits in the context field 358 could indicate whether the access point (or network corresponding to the beacon) supported a variety of different features or network services, e.g., geolocation or QRcode services. Similarly, a byte of the 3-byte context field 358 could be used to indicate a current router load or available radio bandwidth coupled with available upstream internet speed, etc. For example, an 8 bit field could be used to indicate current router load, with 0 meaning no load information, and 1-255 for increasing amounts of radio bandwidth and upstream internet speeds available.

Again, while FIGS. 3A and 3B illustrate data formats that allow vendor, device, product, and context information to be integrated with management frames broadcasting beacon (and probe response) messages configured using the 802.11 network standards, embodiments presented herein may readily be adapted for use with other wireless networking standards, protocols, or approaches.

Figure 4:
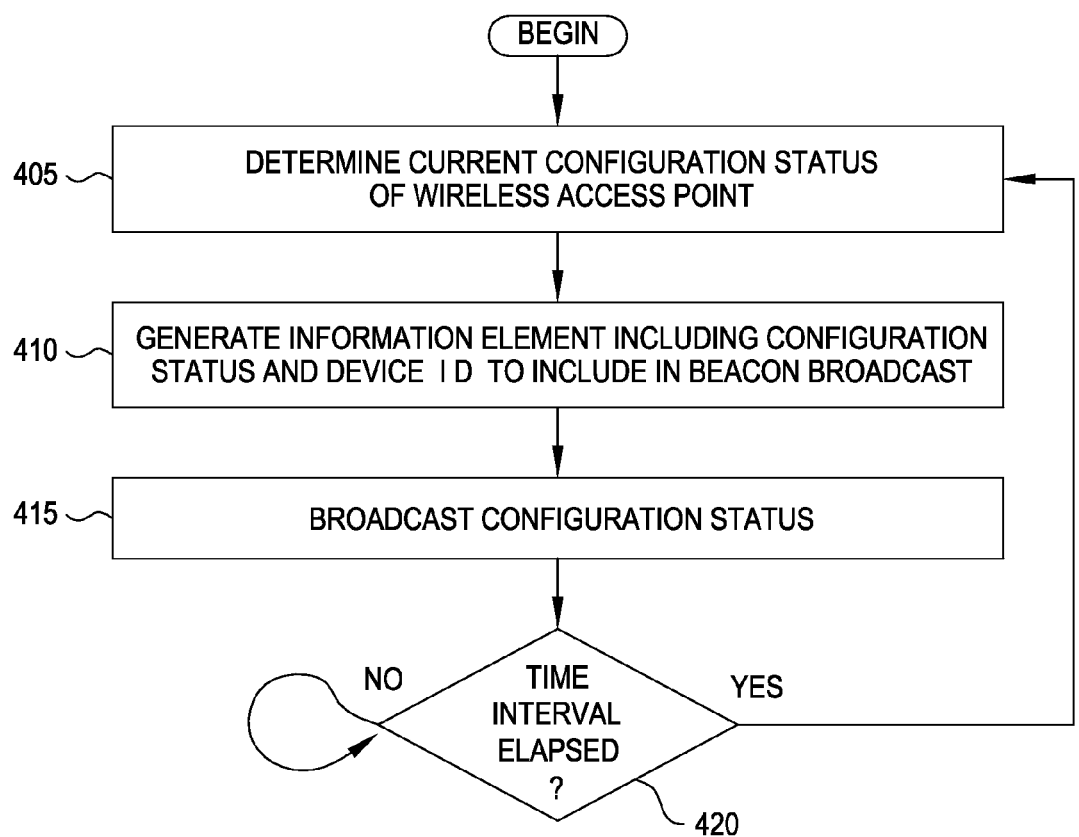
FIG. 4 illustrates a method for a wireless access point to broadcast frames used to identify that wireless access point, according to one embodiment presented in this disclosure.

FIG. 4 illustrates a method 400 for a wireless access point to broadcast frames used to identify that wireless access point, according to one embodiment presented in this disclosure. As shown, the method 400 begins at step 405 where an access point determines a current configuration status of a wireless network on a wireless access point. For example, the access point may provide multiple wireless networks in different radio frequencies. In such a case, when the access point generates a beacon message for one of the wireless networks, e.g., firmware executing on that access point may determine the configuration status of that network.

At step 410, the firmware may generate an information element which includes the configuration status and the device ID to include in the beacon message to be broadcast by that access pint for a given wireless network. Such a beacon may be broadcast for each virtual access point configured on a given device. Similarly, the firmware may determine the current configuration status and device ID information to include in an information element included in a probe response message. Once generated, at step 415, the access point broadcasts the beacon (or probe response) message, where it may be observed by any clients within range of the access point.

As noted, the access point may broadcast a beacon at regular intervals. Accordingly, at step 420, the access point waits until the time interval has elapsed. The method then returns to step 405, where the access point generates and broadcasts a new beacon message. Advantageously, including the information element described herein in beacon messages and probe responses allows client software to determine that a common physical device is being used to host multiple access points or to identify a device across a factory reset or across a variety of different changes to the configuration settings of that device.

As will be appreciated by one skilled in the art, embodiments presented in this disclosure may be implemented as a system, method or computer program product. Accordingly, embodiments presented herein may be implemented as an entirely hardware embodiment, as an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments may be devised without departing from the basic scope thereof. In view of the foregoing, the scope of the present disclosure is determined by the claims that follow.

We claim:

1. A method, comprising:

exposing, on a wireless access point device, at least a first wireless network hosted by a first virtual access point configured on the wireless access point device and a second wireless network hosted by a second virtual access point configured on the wireless access point device;

generating a first management frame corresponding to the first wireless network and a second management frame corresponding to the second wireless network, wherein the first and second management frames each include an information element storing a plurality of information fields, the information fields storing identification information identifying the wireless access point device independently from both a configuration of the first and second wireless networks and a first and second Media Access Control (MAC) address associated with the first and second virtual access points, respectively, and wherein at least a first one of the information fields identify the wireless access point device hosting the first and second virtual access points; and broadcasting the first and second management frames to one or more client devices within range of the wireless access point.

2. The method of claim 1, wherein the first and second management frames are beacon messages broadcast to identify the first and second wireless networks exposed, respectively, by the first and second virtual access points to the one or more client devices.

3. The method of claim 1, further comprising:

receiving, on the first virtual access point, a probe request message, wherein the first management frame is generated and broadcast in response to the probe request message.

4. The method of claim 1, wherein the plurality of information fields include an access point vendor field, an access point product field and an access point device ID field.

5. The method of claim 1, wherein the plurality of information fields include an access point version field.

6. The method of claim 1, wherein the plurality of information fields include an access point device context field.

7. The method of claim 6, wherein the access point device context field identifies whether the first wireless network has either a default device configuration state or a user configured state.

8. The method of claim 6, wherein the access point device context field identifies whether the first wireless network is a guest wireless network or a primary wireless network.

9. A non-transitory computer-readable storage medium storing code for execution by a wireless access point, wherein the code, when executed by the wireless access point, performs an operation, comprising:

exposing, on a wireless access point device, at least a first wireless network hosted by a first virtual access point configured on the wireless access point device and a second wireless network hosted by a second virtual access point configured on the wireless access point device;

generating a first management frame corresponding to the first wireless network and a second management frame corresponding to the second wireless network, wherein the first and second management frames each include an information element storing a plurality of information fields, the information fields storing identification information identifying the wireless access point device independently from both a configuration of the first and second wireless networks and a first and second Media Access Control (MAC) address associated with the first and second virtual access points, respectively, and wherein at least a first one of the information fields identify the wireless access point device hosting the first and second virtual access points; and broadcasting the first and second management frames to one or more client devices within range of the wireless access point.

10. The non-transitory computer-readable storage medium of claim 9, wherein the first and second management frames are beacon messages broadcast to identify the first and second wireless networks exposed, respectively, by the first and second virtual access points to the one or more client devices.

11. The non-transitory computer-readable storage medium of claim 9, wherein the operation further comprises:
receiving, on the first virtual access point, a probe request message, wherein the first management frame is generated and broadcast in response to the probe request message.

12. The non-transitory computer-readable storage medium of claim 9, wherein the plurality of information fields include an access point vendor field, an access point product field and an access point device ID field.

13. The non-transitory computer-readable storage medium of claim 9, wherein the plurality of information fields further include an access point version field.

14. The non-transitory computer-readable storage medium of claim 9, wherein the plurality of information fields include an access point device context field.

15. The computer-readable storage medium of claim 14, wherein the access point device context field identifies whether the first wireless network has either a default device configuration state or a user configured state.

16. The non-transitory computer-readable storage medium of claim 14, wherein the access point device context field identifies whether the first wireless network is a guest wireless network or a primary wireless network.

17. An apparatus, comprising:
a processor; and
a memory storing executable instructions which, when executed on the processor, perform an operation, comprising:
exposing, on a wireless access point device, at least a first wireless network hosted by a first virtual access point configured on the wireless access point device and a second wireless network hosted by a second virtual access point configured on the wireless access point device,
generating a first management frame corresponding to the first wireless and a second management frame corresponding to the second wireless network, wherein the first and second management frames each include an information element storing a plurality of information fields, the information fields storing identification information identifying the wireless access point device independently from both a configuration of the first and second wireless networks and a first and second Media Access Control (MAC) address associated with the first and second virtual access points associated with the first and second virtual access points, respectively, and wherein at least a first one of the information fields identify the wireless access point device hosting the first and second virtual access points, and broadcasting the first and second management frames to one or more client devices within range of the wireless access point.

18. The apparatus of claim 17, wherein the first and second management frames are beacon messages broadcast to identify the first and second wireless networks exposed, respectively, by the first and second virtual access points to the one or more client devices.

19. The apparatus of claim 17, wherein the operation further comprises:
receiving, on the first virtual access point, a probe request message, wherein the first management frame is generated and broadcast in response to the probe request message.

20. The apparatus of claim 17, wherein the plurality of information fields include an access point vendor field, an access point product field and an access point device ID field.

21. The apparatus of claim 17, wherein the plurality of information fields further include an access point version field.

22. The apparatus of claim 17, wherein the plurality of information fields include an access point device context field.

23. The apparatus of claim 22, wherein the access point device context field identifies whether the first wireless network has either a default device configuration state or a user configured state.

24. The apparatus of claim 22, wherein the access point device context field identifies whether the first wireless network is a guest wireless network or a primary wireless network.

25. The apparatus of claim 22, wherein the context field identifies one or more network services supported by the first wireless network.

26. The apparatus of claim 22, wherein the context field identifies an uplink state for the first wireless network exposed on the wireless access point device.

27. The apparatus of claim 22, wherein the context field identifies at least one of a current load or an available radio bandwidth for the first wireless network exposed on the wireless access point device.

* * * * *